United States Patent [19]
Henrie

[11] 3,857,927
[45] Dec. 31, 1974

[54] SYSTEM AND METHOD INCLUDING A CATALYST BED FOR COMBINING HYDROGEN AND OXYGEN GASES

[75] Inventor: James O. Henrie, Hidden Holls, Calif.

[73] Assignee: Rockwell International Corporation, El Segungo, Calif.

[22] Filed: Nov. 30, 1972

[21] Appl. No.: 310,747

Related U.S. Application Data

[63] Continuation of Ser. No. 146,928, May 26, 1972, abandoned.

[52] U.S. Cl. ............... 423/580, 23/2.88 R, 176/37, 252/477 R
[51] Int. Cl. ...... C01b 5/00, G21c 1/04, B01j 11/11
[58] Field of Search ..... 23/288 R; 423/580; 176/37; 252/477 R

[56] References Cited
UNITED STATES PATENTS
2,943,921  7/1960  King .............................. 23/288 R
3,100,141  8/1963  Donovan ........................ 23/288 R Primary Examiner—Oscar R. Vertiz
Assistant Examiner—Hoke S. Miller
Attorney, Agent, or Firm—L. Lee Humphries; Henry Kolin

[57] ABSTRACT

An improved catalyst bed for hydrogen and oxygen gas combiners, and particularly for hydrogen and oxygen gas recombiners for use with nuclear reactors, in which the catalyst bed is relatively thin and has a very large frontal area in relation to the thickness or depth of the catalyst bed. The catalyst bed is designed with a thickness of less than about 0.25 foot and a thickness to frontal area ratio of less than 0.01 ft./ft.$^2$. A modular catalyst bed design employing catalyst cartridges is also disclosed.

10 Claims, 6 Drawing Figures

PATENTED DEC 31 1974 3,857,927

INVENTOR.
JAMES O. HENRIE

BY D. Douglas Price
ATTORNEYS

SYSTEM AND METHOD INCLUDING A CATALYST BED FOR COMBINING HYDROGEN AND OXYGEN GASES

This is a continuation of application Ser. No. 146,928, filed May 26, 1972 and since abandoned.

CROSS-REFERENCE TO RELATED APPLICATION

Reference is made to commonly assigned application Ser. No. 22,633, filed Mar. 25, 1970 now U.S. Pat. No. 3,755,075, for "Condenser-Type Gas Combiner," by James O. Henrie, the applicant herein. This commonly assigned application is directed to a condenser type hydrogen and oxygen gas combiner, and particularly a hydrogen and oxygen gas recombiner for use with nuclear reactors, in which hydrogen and oxygen are combined at low pressures using a condenser as the driving force to transport the hydrogen and oxygen gases through a catalyst bed. The catalyst bed of this commonly assigned application can be designed in accordance with the teachings of the present invention.

BACKGROUND OF THE INVENTION

1. Field of the Invention

This invention relates to a system for combining hydrogen and oxygen gases. More particularly, this invention relates to a system for recombining hydrogen and oxygen gases resulting from the radiolytic decomposition of water in nuclear reactors.

In the operation of homogeneous solution-type nuclear reactors, referred to hereinafter as water boiler reactors, water is radiolytically decomposed into hydrogen and oxygen gases. The recombination of the hydrogen and oxygen gases is vital to the operation of the nuclear reactor since, otherwise, the gases and associated fission products would have to be vented to the atmosphere and a water makeup system would be required to resupply the reactor core with water.

Similarly, in the operation of a boiling-water nuclear reactor, water is radiolytically decomposed into hydrogen and oxygen gases. The hydrogen and oxygen gases are transported along with pressurized steam produced in the reactor core through a steam turbine and then into a steam condenser. The gases which are not condensed in the steam condenser must be pumped from the system. These non-condensable gases contain radioactive materials. To remove the radioactive materials from the gases, it is considered essential to first recombine the hydrogen and oxygen content of the gases, which constitutes about 90 percent of the non-condensables, thereby eliminating potentially explosive mixtures and reducing the volume of gas to be treated for the removal of radioactive materials.

Boiling-water reactors and pressurized water reactors also require hydrogen and oxygen recombiners for use during emergencies such as the postulated loss of coolant accident. Reliability is of prime importance in these emergency systems. Accordingly, simplicity of design is particularly desirable.

Systems designed to combine hydrogen and oxygen formed from the radiolytic decomposition of water in nuclear reactors will be referred to herein as "recombiners" in accordance with established prior art terminology.

2. Description of the Prior Art

Gas recombiners can be classified as convection, diffusion, forced-flow and condenser types. The convection type of gas recombiner relies upon natural convection currents within the hot gases to create a flow of gas across the surface of the catalyst where the recombination occurs. An example of a convection type gas recombiner is shown in U.S. Pat. No. 2,847,284 issued Aug. 12, 1958 to Busey. In the diffusion type of gas recombiner, the gases diffuse randomly from their source to the surface of the catalyst. U.S. Pat. No. 3,098,810 issued July 23, 1963 to McElroy et al, is an example of a diffusion type recombiner. A forced-flow type of gas recombiner system utilizes a blower or pump to force the gases past the surface of a catalyst. An example of this type of recombiner is illustrated by U.S. Pat. No. 2,879,146 issued Mar. 24, 1959 to McElroy et al. The condenser type of gas recombiner is described in commonly assigned application Ser. No. 22,633, supra. In the condenser type of gas recombiner, the condenser is used as the driving force to transport the hydrogen and oxygen gases through the catalyst bed.

Prior catalyst beds for hydrogen and oxygen combination or recombination have been designed with a large thickness or depth in the direction of flow, particularly in relation to the frontal area of the catalyst bed. For example, prior art hydrogen and oxygen gas recombiners for use in boiling-water reactor "off gas" systems have employed catalyst beds which are a number of feet in thickness in the direction of gas flow. It is believed that the use of thick catalyst beds for hydrogen and oxygen combination is based on the belief that such beds are essential for effective recombination, particularly when the gases contain a very low concentration of hydrogen.

The use of thick catalyst bed having a high thickness to frontal area ratio results in much of the hydrogen and oxygen combination occurring deep in the bed. The upstream section of the catalyst bed runs relatively cold in relation to the downstream section of the bed where much of the combination occurs. This low temperature section results in low combination efficiencies. To correct this situation it has been proposed to provide heaters to heat the upstream sections of the catlyst bed. However, the use of such heaters is not conducive to the effective operation of the catalyst bed and represents an added cost factor.

The use of a thick catalyst bed having a high thickness to frontal area ratio is not conducive to the combination of relatively wet gases such as found in the steam condenser of a boiling-water reactor. Accumulation of liquid water in the catalyst bed causes "quenching" or "water poisoning" of the catalyst. This "quenching" of the catalyst occurs in the upstream sections of the bed and then progresses downstream preventing combination. To correct this situation it has been proposed to employ preheaters to dry the gases which enter the catalyst bed and also to use metal base catalysts which do not absorb moisture and are, therefore, less subject to "quenching." These metal base catalysts, however, are considerably more expensive and less efficient than the more conventional platinized alumina catalysts. Additionally, the continuous use of gas preheaters is an added cost factor in the hydrogen and oxygen combination process.

Finally the use of thick catalyst beds having small frontal areas results in relatively high gas velocities. These relatively high gas velocities result in relatively high pressure drops across the catalyst bed and correspondingly increased gas pumping costs. The use of relatively high gas velocities also results in "dusting" or erosion of the catalyst material, which has been given as another reason for using the more expensive metal base catalysts.

SUMMARY OF THE INVENTION

The present invention is directed to a new catalyst bed design for the combination of hydrogen and oxygen gases and particularly for the recombination of hydrogen and oxygen gases from nuclear reactors. The catalyst bed is designed with a thickness of less than about 0.25 foot and a thickness to frontal area ratio of less than 0.01 ft./ft.$^2$. The present invention is also directed to the use of catalyst cartridges which may be used singly or in groups to form combiners and recombiners. Additionally, this invention is directed to an improved method of combining hydrogen and oxygen to form water vapor.

The use of a relatively thin catalyst bed with a low thickness to frontal area ratio yields several advantages not found in prior art catalyst beds for hydrogen and oxygen combination. Most of the hydrogen and oxygen combination occurs near the front face of thin catalyst beds designed in accordance with the present invention and, accordingly, the upstream sections of the bed are heated to a relatively high temperature. Additionally, because of the relative thinness of the catalyst bed, heat is efficiently transferred by radiation and conduction from the downstream sections to the upstream sections of the bed. This heating of the upstream sections of the catalyst bed results in a relatively small temperature gradient across most of the thickness of the bed and yields high combination efficiencies. Because of the heating of the upstream sections of the catalyst bed, heaters are not required to heat these sections of the bed. The combination of most of the hydrogen and oxygen near the front face of the catalyst bed also means that incoming wet gases are dried in the upstream sections of the bed. Additionally, because of the relatively large frontal area, there is less water to remove per unit of frontal area. Accordingly, the necessity for continuously drying wet gases before the gases enter the catalyst bed is avoided. Because of the drying of the incoming wet gas streams, conventional catalysts such as platinized alumina may be employed rather than the more expensive metal base catalysts required in the prior art to avoid "water poisoning." Because of the relatively small thickness of the catalyst bed, pressure drops are reduced to near zero and pumping costs are correspondingly reduced. Additionally, lower gas velocities than commonly used in the prior art can be employed while still providing the same residence times as are provided by prior art catalyst beds which are relatively thick and have a relatively small frontal area.

An object of the present invention is the provision of an improved hydrogen and oxygen combiner and particularly an improved hydrogen and oxygen recombiner for use with nuclear reactor systems.

A further object of the present invention is the provision of an improved catalyst cartridge for use in hydrogen and oxygen gas combination and recombination.

Further objects and advantages of the present invention will become apparent upon reading the undergoing specification and claims.

DESCRIPTION OF THE PREFERRED EMBODIMENTS

The present invention is directed to improvements in catalyst beds used to convert hydrogen and oxygen gas to water vapor and particularly to recombine hydrogen and oxygen formed by the radiolytic decomposition of water in nuclear reactors. The present invention is also directed to modular catalyst bed designs employing catalyst cartridges and to an improved method of combining hydrogen and oxygen.

The catalyst beds of the present invention are designed with a thickness of less than about 0.25 foot and a thickness to frontal area ratio of less than 0.01 ft./ft.$^2$ and preferably with a thickness of less than about 0.10 foot and thickness to frontal area ratio of less than 0.001 ft./ft.$^2$. The "thickness" of the catalyst bed is the distance which the gases must travel to traverse the catalyst bed from the inlet or upstream side to the exit or downstream side of the bed. The "frontal area" of the catalyst bed is the total entrance surface area of the bed.

Figure 1:
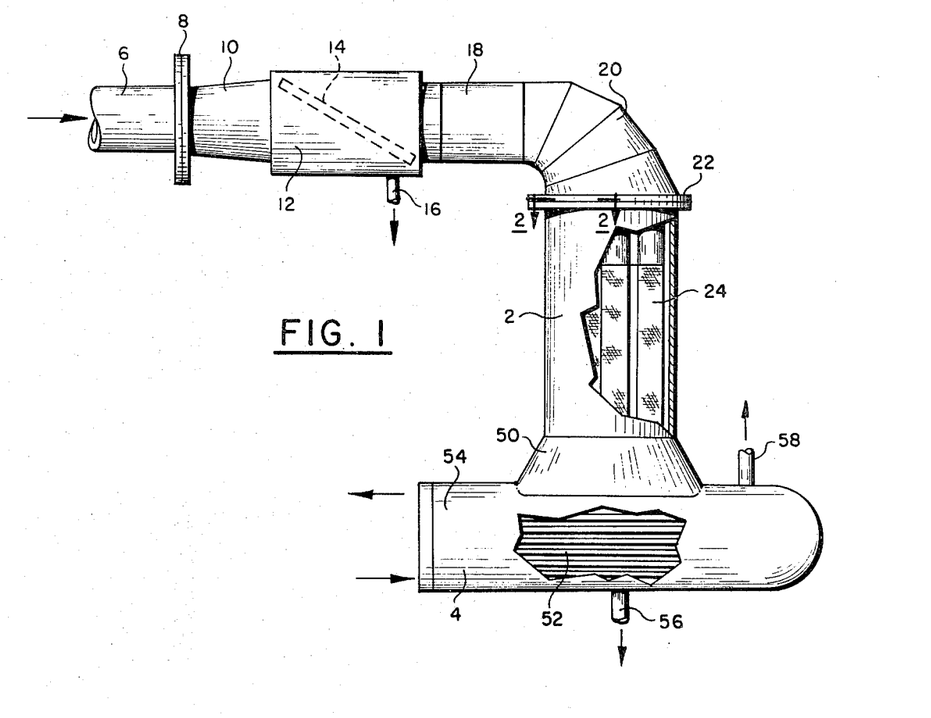
FIG. 1 is a partially cutaway, perspective view of a hydrogen and oxygen recombiner of the present invention.

Referring now in detail to the drawings, FIG. 1 shows a hydrogen and oxygen gas recombiner for treatment of the off gases from the steam condenser of a boiling-water reactor power cycle. Boiling-water reactors incur radiolytic water decomposition within the core. The hydrogen and oxygen formed in the core region typically constitute about 15 to 30 parts per million by weight. Relatively small amounts of radioactive non-condensable materials are also formed in the core. All of these gases are carried with the steam formed in the core through steam turbines and then into a steam condenser which converts most of the remaining steam to water for return to the reactor. The off gases from the steam condenser consists of hydrogen, oxygen, water vapor, air and non-condensable radioactive materials. Efficient removal of radioactive materials from these off gases first requires the combination of hydrogen and oxygen to prevent explosions and to reduce the volume of the gases treated.

FIG. 1 shows a condenser type of gas recombiner including recombiner vessel 2 and condenser 4. Duct 6 establishes fluid communication with the steam condenser section of the boiling-water reactor power cycle (not shown). Duct 6 is attached by flange 8 to entrance duct 10 which leads to demister 12. The demister contains suitable baffles 14 which act to remove entrained moisture droplets carried by the gaseous effluent from the steam condenser section of the boiling-water reactor power cycle. Water is withdrawn from demister 12 by drain line 16. Preheater 18 is used during startup of the recombiner to dry the wet gases in order to assure a dry catalyst bed at startup and to insure efficient and complete catalytic recombination. Preheater 18 is also used when low hydrogen and oxygen concentrations are present in the gaseous effluent from the boiling-water reactor power cycle, since the heat generated by the exothermic reaction of hydrogen and oxygen in low concentrations is not sufficient to provide the high temperature conditions needed for efficient catalytic recombination. Duct 20 directs the effluent gases leaving preheater 18 to recombiner vessel 2. Duct 20 is attached to recombiner vessel 2 by flange 22. Recombiner vessel 2 contains a plurality of catalyst cartridges 24. The catalyst cartridges typically are positioned in a generally symmetrical, vertical array within recombiner vessel. The recombiner shell containing the catalyst cartridges can be cooled by external cooling coils or jackets (not shown) if desired.

Figure 2:
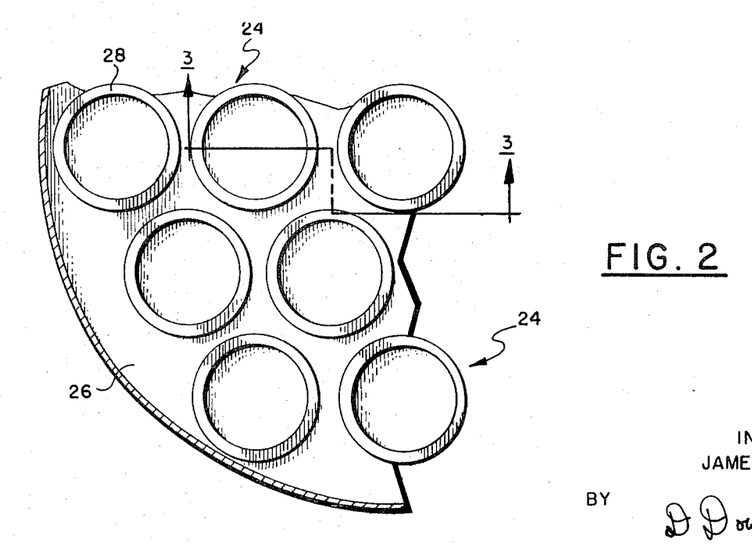
FIG. 2 is a plan view, taken along line 2—2 of FIG. 1, illustrating a catalyst cartridge assembly of the present invention.
Figure 3:
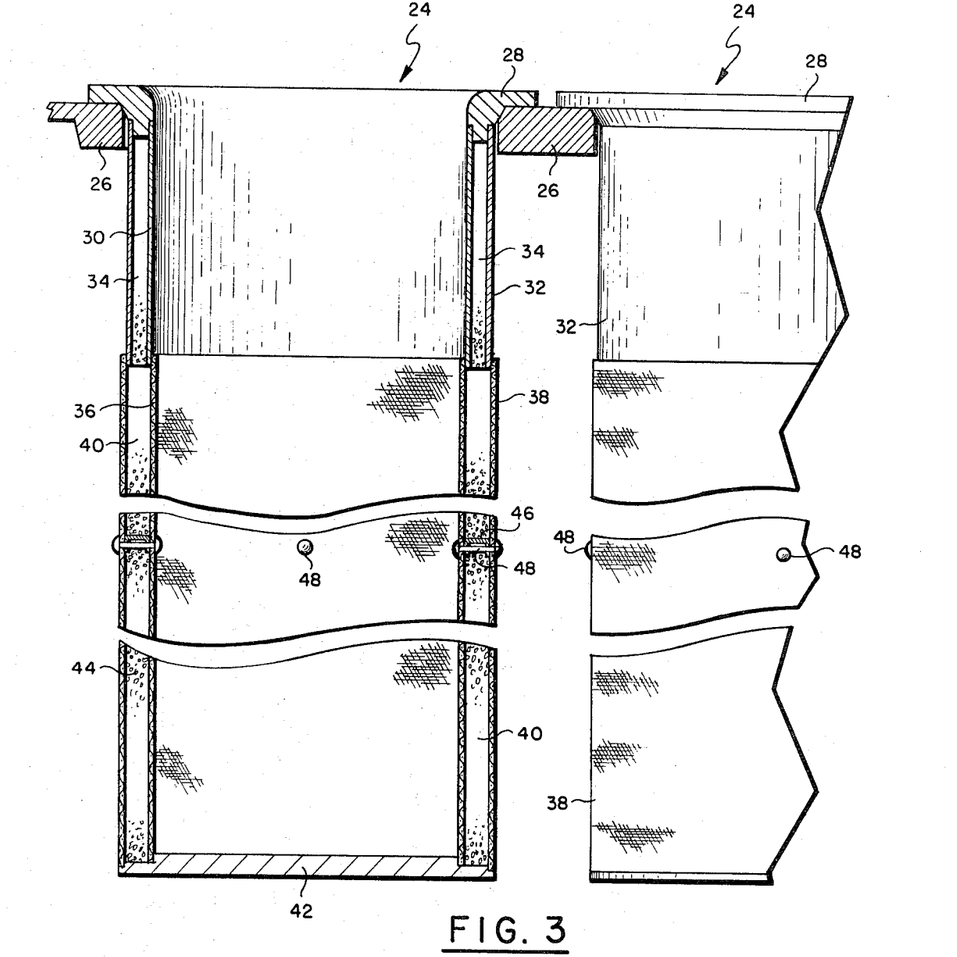
FIG. 3 is a side elevational view, taken along line 3—3 of FIG. 2, illustrating a catalyst cartridge according to the present invention.

The catalyst cartridges are shown in further detail in FIGS. 2 and 3. FIG. 2 is a plan view, taken along line 2—2 of FIG. 1, and shown approximately one-quarter of the top section of the catalyst bed. Catalyst cartridges 24 are suspended from top plate 26 by flanges 28. Top plate 26 is located in flange 22. FIG. 3 shows a side elevational view of catalyst cartridge 24 taken along line 3—3 of FIG. 2.

Catalyst cartridges 24 are inserted through openings in top plate 26 and are suspended from top plate 26 by flange 28. Inner cylinder wall 30 and outer cylinder wall 32 are concentric and attached to and suspended from flange 28 and define annular chamber 34. Inner and outer cylinder walls 30 and 32, respectively, are gas impermeable and typically formed from a metal such as stainless steel. Inner cylinder wall 36 and outer cylinder wall 38 are concentric and are attached to and suspended from the bottom ends of walls 30 and 32, respectively, and define annular chamber 40. Inner and outer cylinder walls 36 and 38, respectively, are gas permeable and permit the effluent gases from the steam condenser of the boiling-water reactor power cycle to pass through the catalyst bed. Cylinder walls 36 and 38 can conveniently be formed from wire mesh such as stainless steel wire mesh. Cylinder walls 36 and 38 extend to catalyst cartridge bottom plate 42. Annular chamber 40 is packed with catalyst 44, such as platinized alumina, and defines the catalyst bed.

The radial distance between cylinder walls 36 and 38 is the thickness of the catalyst bed. The total frontal area of the catalyst bed of the recombiner can be computed by multiplying the total frontal area of each of the catalyst cartridges times the number of catalyst cartridges. In the present illustration, the inlet or front surface of the catalyst bed is the curved surface of a right cylinder. Accordingly, the frontal area of each of the catalyst cartridges is determined by the conventional formula $\pi dh$ in which d is the inside diameter of the catalyst bed or, in other words, the outside diameter of inner cylinder wall 36 and h is the height of the catalyst bed or, in other words, approximately the height of cylinder walls 36 or 38.

Catalyst 44 is not only packed in annular chamber 40 but is also packed in annular chamber 34 so that as the catalyst settles during operation effluent gases from the steam condenser of the boiling-water reactor power cycle will not be able to bypass the catalyst through air spaces formed at the top of annular chamber 40. In other words, as the catalyst settles in annular chamber 40, it is continually replenished by catalyst which is gravity fed from annular chamber 34 such that there is no air gap at the interface between annular chamber 34 and 40.

Annular ring channels 46 are placed at predetermined heights within annular chamber 40. Ring channels 46 are generally inverted U-shaped channels. These ring channels may conveniently be formed of metal or other gas impermeable material such as stainless steel. The channels are held in position by supports 48 which extend through holes or apertures formed in clyinder walls 36 and 38 and ring channel 46. These supports are typically pull rivets or a nut and bolt combination. As illustrated in the drawing, four supports 48 are employed for each ring channel.

Figure 4:
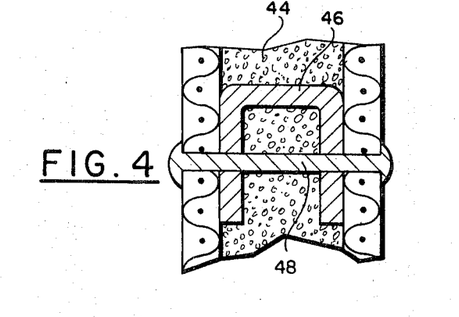
FIG. 4 is a partially cutaway, side elevational view of a ring channel used in a catalyst cartridge of the present invention to add support to the cartridge, to prevent excessive settling of the catalyst in the cartridge and to insure that catalyst settling does not cause gas bypass of the catalyst during operation.

Referring now to FIG. 4, an enlarged cross-sectional, side elevational view of ring channel 46 is shown. As shown in FIG. 4, catalyst 44 is stacked or packed on top of ring channels 46. In this regard, therefore, ring channels 46 function as a catalyst spacer or divider and prevents excessive settling of the catalyst. Catalyst 44 is also stacked or packed inside the chamber formed by the opposed legs of ring channel 46. In this regard, ring channels 46 provide the same function as annular chamber 34 and insure that catalyst settling does not allow effluent gases from the steam condenser of the boiling-water reactor power system to bypass the catalyst through air spaces formed below the ring channels. In other words, as catalyst 44 settles in annular chamber 40, this catalyst material is replenished by catalyst material gravity fed from inside ring channel 46. Obviously, the height of ring channels 46 will be determined by the settling characteristics of the catalyst employed in order to avoid an air gap between the bottom of ring channels 46 and the top of the annular column of catalyst material. Ring channel 46 also functions to add structural support to annular chamber 40.

Referring again to FIG. 1, recombiner vessel 2 is attached to condenser 4 by duct 50. Condenser 4 is of conventional design and consists of a plurality of cooling tubes 52 positioned within a shell 54. Drain line 56 is used to remove condensed water and gas line 58 is used to remove non-condensable gases from the condenser. The non-condensable gases are led via line 58 to an air ejector and gas treatment zone (not shown) where the gases are pumped to atmospheric pressure, filtered, adsorbed or otherwise treated to remove a portion or all of the radioactive material contained therein. The treated and cleaned gases are then vented to the atmosphere.

In operation, effluent gases from the steam condenser of a boiling-water reactor power system enter duct 6 and are passed by duct 10 to demister 12 where a substantial portion of the entrained water is removed through drain line 16. From there the gases pass through preheater 18 and then via duct 20 into recombiner vessel 2. The effluent gases then pass into catalyst cartridges 24 and, on contact with the catalyst bed, the hydrogen and oxygen are recombined to form water vapor. The water vapor and associated gases are then conducted by duct 50 to condenser 4 where the water vapor portion of the gases is condensed to liquid form and withdrawn through drain line 56. The non-condensable gases are withdrawn through gas line 58 and treated as described above.

Figure 5:
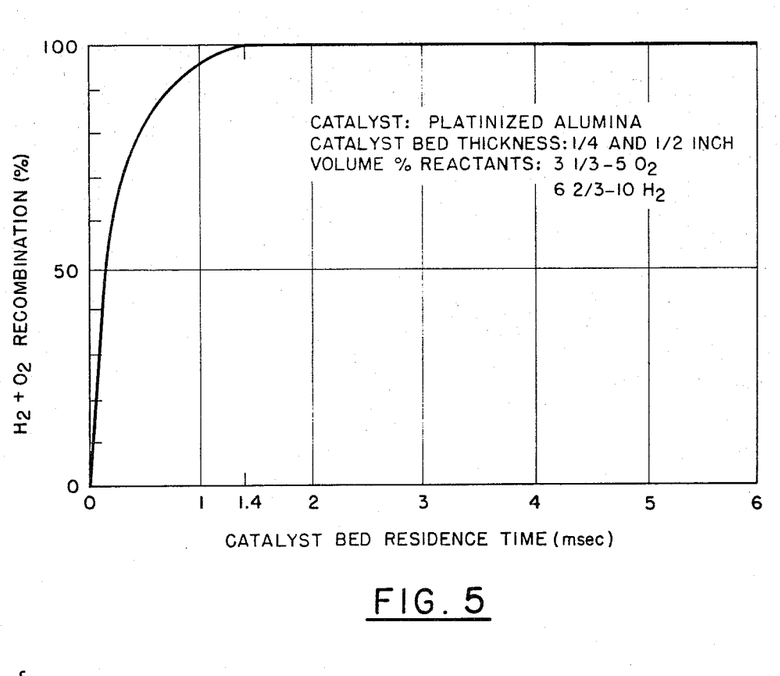
FIG. 5 is a graph illustrating the percent completion of the combination of hydrogen and oxygen gas in a thin catalyst bed as a function of the residence time of the hydrogen and oxygen in the bed.

Turning now to FIG. 5, a graph is shown of percent hydrogen and oxygen recombination as a function of catalyst bed residence time. The specified residence time is a "superficial" residence time computed by dividing the total volume defined by the catalyst bed by the volume flow rate of gases passed through the catalyst bed. As set forth in the legend of FIG. 5, the curve presented therein is specific to platinized alumina catalyst beds of ¼ and ½ inch thickness in which the inlet gas stream contains between about 6-⅔ to 10 volume percent hydrogen and 3-⅓ to 5 volume percent oxygen in stoichiometric quantities. The relationship between the percent hydrogen and oxygen recombination and catalyst bed residence time presented in FIG. 5 was determined experimentally and has been demonstrated to be essentially the same for pressures between 1 inch of mercury and 1,000 psi. As shown in FIG. 5, at these concentrations, at least 99 percent of the hydrogen and oxygen is recombined when exposed to the platinized alumina catalyst used for 1.4 milliseconds. This rapid recombination of hydrogen and oxygen can be effected using a thin catalyst bed because, among other reasons, of the relatively high temperatures which are obtained in the upstream sections of the bed as illustrated in FIG. 6.

Figure 6:
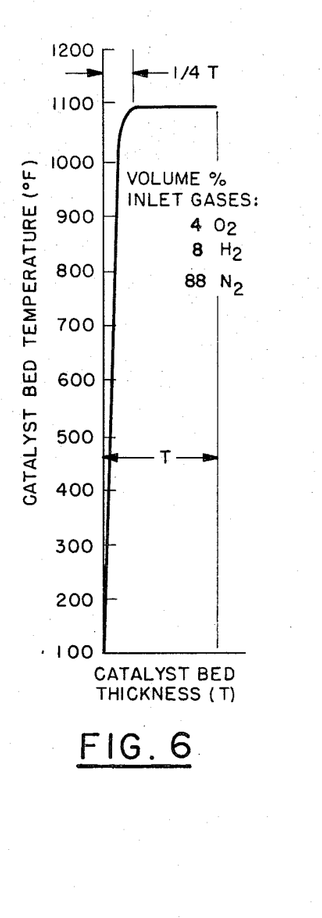
FIG. 6 is a graph illustrating the temperature profile of a thin catalyst bed in which hydrogen and oxygen are undergoing exothermic combination.

FIG. 6 is a graph illustrating the temperature in degrees Fahrenheit in the catalyst beds of FIG. 5 as a function of the thickness (T) of the bed. The graph in FIG. 6 was constructed from data obtained from hydrogen and oxygen recombination in a gas stream containing 8 volume percent hydrogen, 4 volume percent oxygen and 88 volume percent nitrogen. As shown in FIG. 6, the last three-quarters of the catalyst bed operates at maximum temperature, namely, about 1,100°F; or, in other words, only the first quarter (1/4 T) of the bed operates at less than maximum temperature. The attainment of a temperature of 1,100°F in the catalyst bed corresponds to the point at which approximately 99 percent of the hydrogen and oxygen are recombined or, in other words, to a residence time of 1.4 milliseconds. Accordingly, 99 percent of the hydrogen and oxygen recombination has occurred by the time one-fourth of the thickness of the catalyst bed is traversed. These catalyst bed conditions as represented in FIGS. 5 and 6 are in sharp contrast to the conditions prevailing in conventional catalyst beds in which 99 percent of the recombination does not occur until deep in the catalyst bed.

The catalyst used in accordance with the present invention may be any catalyst which is effective in promoting the reaction $2H_2 + O_2 \rightarrow 2H_2O$. An advantage of the present invention, however, is that conventional catalysts such as platinized alumina may be employed while still obtaining highly efficient catalyst bed operation. Typical catalysts are the noble metals, namely, gold, silver, mercury, platinum, palladium, iridium, rhodium, ruthenium and osmium and mixtures thereof. Typical catalysts bases are alumina, silica, beryllia, zirconia, magnesia and combinations thereof such as boria-alumina and silica-alumina. The shape of the catalyst material may be of any common design for porous beds such as pills, pellets, spheres, coated wires, foils, tapes or tubes. The particle size and packing density in the catalyst bed is not critical and any conventional arrangement may be employed.

The catalyst bed design of the present invention is essentially non-pressure sensitive as cogently illustrated in FIG. 5 and can be operated over the range of pressures normally found in hydrogen and oxygen combiners and particularly in hydrogen and oxygen recombiners. The intake pressure to the catalyst bed will vary depending upon the source of the hydrogen and oxygen gases to be combined and will normally range between 2 and 100 centimeters of mercury.

Temperatures within the catalyst bed may vary over a very wide range, from room temperature or below up to near the catalyst decomposition temperature. The heat formed by the exothermic combination of hydrogen and oxygen is removed from the catalyst bed by the gas stream flowing through the bed. The temperature rise of the gas is dependent upon its constituents and flow rate. The extent of water vapor condensation occurring in the condenser, if a condenser is employed, will vary depending upon the use of the invention and upon the economic conditions prevailing at the time.

The volume concentration of hydrogen and oxygen in the entering gas stream will be controlled to avoid the presence of explosive mixtures as is conventional in the art. It is also preferred to handle mixtures of hydrogen and oxygen in which a flame cannot be propagated. The avoidance of explosive mixtures of hydrogen and oxygen and the avoidance of mixtures of hydrogen and oxygen in which a flame can be propagated can be accomplished by controlling the concentration of hydrogen, the concentration of oxygen or the pressure at which the combination or recombination is effected. For example, a flame cannot be propagated in a hydrogen and oxygen mixture containing either less than about 5 volume percent oxygen or less than about 4.1 volume percent hydrogen at atmospheric pressure. Much higher concentrations of hydrogen and oxygen can be employed without reaching the explosive concentration range. With respect to pressure control, experiments have shown that hydrogen and oxygen will not explode in the presence of a glowing filament at room temperature if the pressure is below about 40 centimeters of mercury; furthermore, a flame cannot be initiated in a mixture by a glowing filament if the pressure is below about 7.5 centimeters of mercury.

The concentration of hydrogen and oxygen in the gaseous mixture entering the recombiner can be controlled in conventional manner by adding a diluent to the hydrogen and oxygen gas stream. The diluent can be in inert gas, air or water vapor. However, it is preferred to employ water vapor diluent since the use of a non-condensable diluent such as nitrogen or air is self-defeating in that it greatly increases the gas volume and makes it more difficult and expensive to remove radioactive materials when the recombiner is employed in conjunction with a nuclear reactor system. In the case of a condenser type of recombiner for use with a nuclear reactor system, the water vapor diluent is drawn directly from the main steam condenser.

It is generally preferred to operate the catalyst bed of the present invention with gas streams containing about 1 to 8 volume percent hydrogen since, if the gas stream contains less than about 1 volume percent hydrogen, continuous preheating of the gas stream may be required in order to obtain sufficiently high temperatures in the catalyst bed for efficient operation. Concentrations of hydrogen above about 8 volume percent lead to temperatures in the catalyst bed above about 1,100°F which is generally not preferred. However, temperatures up to near the catalyst decomposition temperature can be employed if desired, as mentioned previously.

The catalyst bed design of the present invention can be employed with convection, diffusion, forced-flow and condenser types of gas combiners and recombiners. Additionally, the combiner can be designed as a recombiner for postulated emergency loss of coolant accidents in boiling-water and pressurized water reactors. In this system a condenser is not conventionally used and the conventional arrangement includes a demister followed by a fan or blower, a heater, an iodine trap, and then the catalytic recombiner.

As illustrative of the present invention, a condenser type of gas recombiner was designed for use with a 1,100 MWe boiling-water reactor power cycle. The condenser type of gas recombiner was of the general type described in commonly assigned application Ser. No. 22,633, supra, in which hydrogen and oxygen are recombined at low pressure using the recombiner condenser as a driving force to transport the hydrogen and oxygen gases through the catalyst bed. The non-condensable gases accumulating in the main steam condenser of the boiling-water reactor power cycle are drawn into the off gas system by a differential pressure maintained by the recombiner condenser. The differential pressure can be provided by maintaining a lower condensing temperature (e.g., about 10°F) in the recombiner condenser than in the main steam condenser.

In order to assure a dry catalyst bed for startup and for efficient and complete catalytic recombination, the off gases from the main steam condenser of the boiling-water reactor power cycle are first directed through a demister and then a preheater. The demister consists of a baffled moisture eliminator to remove most of the entrained liquid water and the preheater consists, for example, of a steam heated shell and tube-type heat exchanger. Steam to the preheater is required only during startup to assure a dry condition in the catalytic recombiner unit. The entrance temperature at the preheater will typically be about 80°F and the exit temperature about 110°F and a nominal temperature drop of about 0.1 inch of mercury will normally be experienced across the preheater.

The design gas flow rate to the recombiner vessel is about 7,000 lbs./hr. of which about 6,340 lbs/hr. will consist of water vapor and about 660 lbs./hr. will consist of non-condensables. The inlet pressure to the recombiner vessel will typically vary between about 1 and 3 inch of mercury. The recombiner vessel and additionally the preheater and condenser are designed for operation between full vacuum and about 75 psig. In the present illustration, the shell of the recombiner vessel is cooled to about 200°F by an external cooling jacket.

The recombiner vessel contains the catalyst bed which, in this illustration, is designed with a thickness to frontal area ratio of less than 0.0001 ft./ft.$^2$. This thickness to frontal area ratio is provided by employing a catalyst bed with a thickness of ½ inch and a total frontal area of 550 ft.$^2$. The recombiner vessel contains 19 cylindrical catalyst cartridges of the type shown in FIGS. 1, 2 and 3. The catalyst cartridges are vertically aligned and symmetrically arranged as shown in the plan view of FIG. 2. Each of the catalyst cartridges has an inner diameter of 11 inches, an outer diameter of 12 inches and a total length of 132 inches. The active length of the catalyst cartridges or, in other words, the height of the active catalyst bed and, correspondingly, approximately the height of the gas permeable cylinder walls, is 120 inches. Each of the catalyst cartridges provides a total catalyst volume of 1.3 ft.$^3$, of which 1.2 ft.$^3$ is active in the sense that it is exposed to the passage of off gases from the main steam condenser. The gas permeable walls of the catalyst cartridges are formed from stainless steel wire mesh with a wire diameter of about 0.05 inch and an 8 × 8 inch mesh.

Platinized alumina supplied by Englehard Industries, Inc., Newark, N.J. was employed as the catalyst. The platinized alumina catalyst contained approximately 0.03 weight percent platinum. The catalyst pellets were cylindrical in shape and were ⅛ inch in diameter × ⅛ inch long. The catalyst material was packed with a bulk density of about 59 lbs./ft.$^3$ and a pellet density of about 89 lbs./ft.$^3$. The void fraction (bulk) was about 33 percent. About 24 total cubic feet of catalyst is present in the recombiner vessel. The catalyst bed contains over 11 million catalyst pellets and there are over 2.5 million catalyst pellets in the first layer of ⅛ inch thickness of the catalyst bed. Over 99 percent of the hydrogen and oxygen recombination takes place in this first ⅛ inch layer of catalyst bed. Accordingly, the upstream sections of the catalyst bed run hot, superheating the incoming water vapor and gas mixture. The pressure drop across the catalyst bed is about 0.06 inch of mercury and the total pressure loss across the recombiner vessel is about 0.07 inch of mercury.

When operating the recombiner vessel with an inlet pressure of 1 inch of mercury and when operating the catalyst bed with an exit pressure of about 0.9 inch of mercury and an exit temperature of about 1,100°F, the volume flow rate is about 4,100 cfs (ft.$^3$/sec.). The "superficial" residence time will therefore be about 6 milliseconds (24 ft.$^3$/4,100 ft.$^3$/sec.). This is more than four times the residence time required to recombine 99 percent of the hydrogen and oxygen present in the off gases (see FIG. 5). This residence time will reduce the hydrogen concentration in the off gas effluent from nominal 8 by volume to a very low level. When higher pressures are employed in the recombiner vessel the residence time increases correspondingly.

The gases from the recombiner vessel are directed to a condenser where steam is desuperheated and condensed to a temperature necessary for providing the differential pressure required for flow. The gas flow rate through the condenser will typically be about 7,000 lbs./hr. of which about 6,820 lbs./hr. will be water vapor and about 180 lbs./hr. non-condensable gases, mainly air. A steam jet air ejector is used to remove the non-condensable gases and the remaining relatively small quantities of steam from the condenser and to raise their pressure to above atmospheric. The pressure drop across the condenser is typically about 0.1 inch of mercury and the condenser is typically designed to handle gases having temperatures between about 70° and 1,100°F on the shell side.

Although particular embodiments of this invention have been described, it should be understood that various other modifications and adaptations thereof may be made by those skilled in this particular art without departing from the spirit and scope of this invention as set forth in the following claims.

I claim:

1. A system for recombining hydrogen and oxygen gases comprising:
    A. a source of hydrogen and oxygen gases;
    B. a catalyst bed having a thickness of less than 0.25 foot and a thickness to frontal area ratio of less than 0.01 ft./ft.$^2$, the catalyst being effective to promote the reaction:

$$2H_2 + O_2 \rightarrow 2H_2O;$$

and
    C. means for flowing said hydrogen and said oxygen gases through said catalyst bed.

2. The system of claim 1 in which the thickness of the catalyst bed is less than about 0.10 foot and the thickness to frontal area ratio of the catalyst bed is less than 0.001 ft./ft.$^2$.

3. The system of claim 1 in which the catalyst bed is contained in at least one modular catalyst cartridge.

4. The system of claim 3 in which the modular catalyst cartridge comprises two gas permeable walls which define a catalyst chamber, said catalyst chamber being packed with catalyst to form the catalyst bed.

5. The system of claim 4 in which the gas permeable walls are concentric, cylindrical walls and define an annular catalyst chamber.

6. The system of claim 4 in which the modular catalyst cartridge includes at least one spacer located between the two gas permeable walls and in the catalyst chamber, said spacer acting as a support for said gas permeable walls and as a support for the catalyst packed in said catalyst chamber to prevent excessive catalyst settling.

7. The system of claim 3 in which the modular catalyst cartridge is cylindrical in shape and is vertically oriented and in which said modular catalyst cartridge comprises two gas impermeable walls which define a first catalyst chamber, said first catalyst chamber being packed with catalyst, and two gas permeable walls which define a second catalyst chamber, said second catalyst chamber being packed with catalyst to form the catalyst bed, said first catalyst chamber being in communication with said second catalyst chamber such that catalyst is gravity fed into said second catalyst chamber from said first catalyst chamber when catalyst settling occurs in said second catalyst chamber.

8. The system of claim 7 in which the modular catalyst cartridge includes at least one gas impermeable spacer located between the two gas permeable walls and in the second catalyst chamber, said spacer comprising an inverted U-shaped channel which defines a third catalyst chamber, said third catalyst chamber being packed with catalyst, said third catalyst chamber being in communication with said second catalyst chamber such that catalyst is gravity fed into said second catalyst chamber from said third catalyst chamber when catalyst settling occurs in said second catalyst chamber.

9. In the method for combining hydrogen and oxygen in which the hydrogen and oxygen are contacted with a catalyst bed in which the catalyst is effective to promote the reaction:

$$2H_2 + O_2 \rightarrow 2H_2O,$$

the improvement comprising contacting the hydrogen and oxygen with a catalyst bed which has a thickness of less than about 0.25 foot and a thickness to frontal area ratio of less than 0.01 ft./ft.$^2$.

10. The method of claim 9 in which the hydrogen and oxygen are contacted with a catalyst bed having a thickness of less than about 0.10 foot and a thickness to frontal area ratio of less than 0.001 ft./ft.$^2$.

* * * * *

UNITED STATES PATENT AND TRADEMARK OFFICE
CERTIFICATE OF CORRECTION

PATENT NO. : 3,857,927
DATED : Dec. 31, 1974
INVENTOR(S) : James O. Henrie

It is certified that error appears in the above-identified patent and that said Letters Patent are hereby corrected as shown below:

On front page, under [75], "Hidden Holls" should read --Hidden Hills--; under [73], "El Segungo" should read --El Segundo--.

Column 2, line 33, after "of" insert --a--.

Column 10, line 46, after "8" insert --percent--.

Signed and Sealed this first Day of June 1976

[SEAL]

Attest:

RUTH C. MASON
Attesting Officer

C. MARSHALL DANN
Commissioner of Patents and Trademarks